(12) United States Patent
Terlep

(10) Patent No.: US 11,373,465 B1
(45) Date of Patent: Jun. 28, 2022

(54) VEHICLE TEST DRIVE SYSTEM AND METHOD OF USE

(71) Applicant: Frank M Terlep, Richardson, TX (US)

(72) Inventor: Frank M Terlep, Richardson, TX (US)

( * ) Notice: Subject to any disclaimer, the term of this patent is extended or adjusted under 35 U.S.C. 154(b) by 0 days.

(21) Appl. No.: 17/316,121

(22) Filed: May 10, 2021

(51) Int. Cl.
*G07C 5/00* (2006.01)
*G07C 5/08* (2006.01)

(52) U.S. Cl.
CPC .............. *G07C 5/008* (2013.01); *G07C 5/085* (2013.01)

(58) Field of Classification Search
CPC ................................. G07C 5/008; G07C 5/085
See application file for complete search history.

(56) References Cited

U.S. PATENT DOCUMENTS

2016/0247331 A1* 8/2016 Cacabelos ............ G07C 5/0808
2021/0192867 A1* 6/2021 Fang .................... G07C 5/0816

* cited by examiner

*Primary Examiner* — Michael V Kerrigan
(74) *Attorney, Agent, or Firm* — Leavitt Eldredge Law Firm

(57) ABSTRACT

A test drive system that tracks the status of a repair of a vehicle or a request for a test drive. The system captures information from the vehicle or the operator while the test drive is performed. The data is used to document aspects of the test drive such as distance, speed and performance of the ADAS of the vehicle.

1 Claim, 5 Drawing Sheets

VEHICLE TEST DRIVE SYSTEM AND METHOD OF USE

BACKGROUND

1. Field of the Invention

The present invention relates generally to automotive service systems, and more specifically, to a test drive system for coordinating a vehicle for evaluation through a road test where data about the test is captured from the driver, the vehicle and other sources.

2. Description of Related Art

Automotive service systems are well known in the art and are effective means to provide repair, cleaning or maintenance work to a vehicle. For example, after an accident or when the vehicle is not working properly it requires repair. Part of this repair is verifying that the repair was successful by operating the vehicle during a test drive. It is common to have a several mile drive to ensure that the problem or issue does not return after mild use. Also, the drive demonstrates and ensures that the safety systems of the vehicle operate as designed. This could include sensors, mirrors, alarms cameras or the like.

One of the problems commonly associated with conventional automotive repair systems is its limited use. For example, it is difficult to prove where the vehicle was driven and in what manner it was driven. The current method offers no transparency to the owner of the vehicle that it was treated properly or not used contrary to the expectations of the owner.

Accordingly, although great strides have been made in the area of automotive service systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
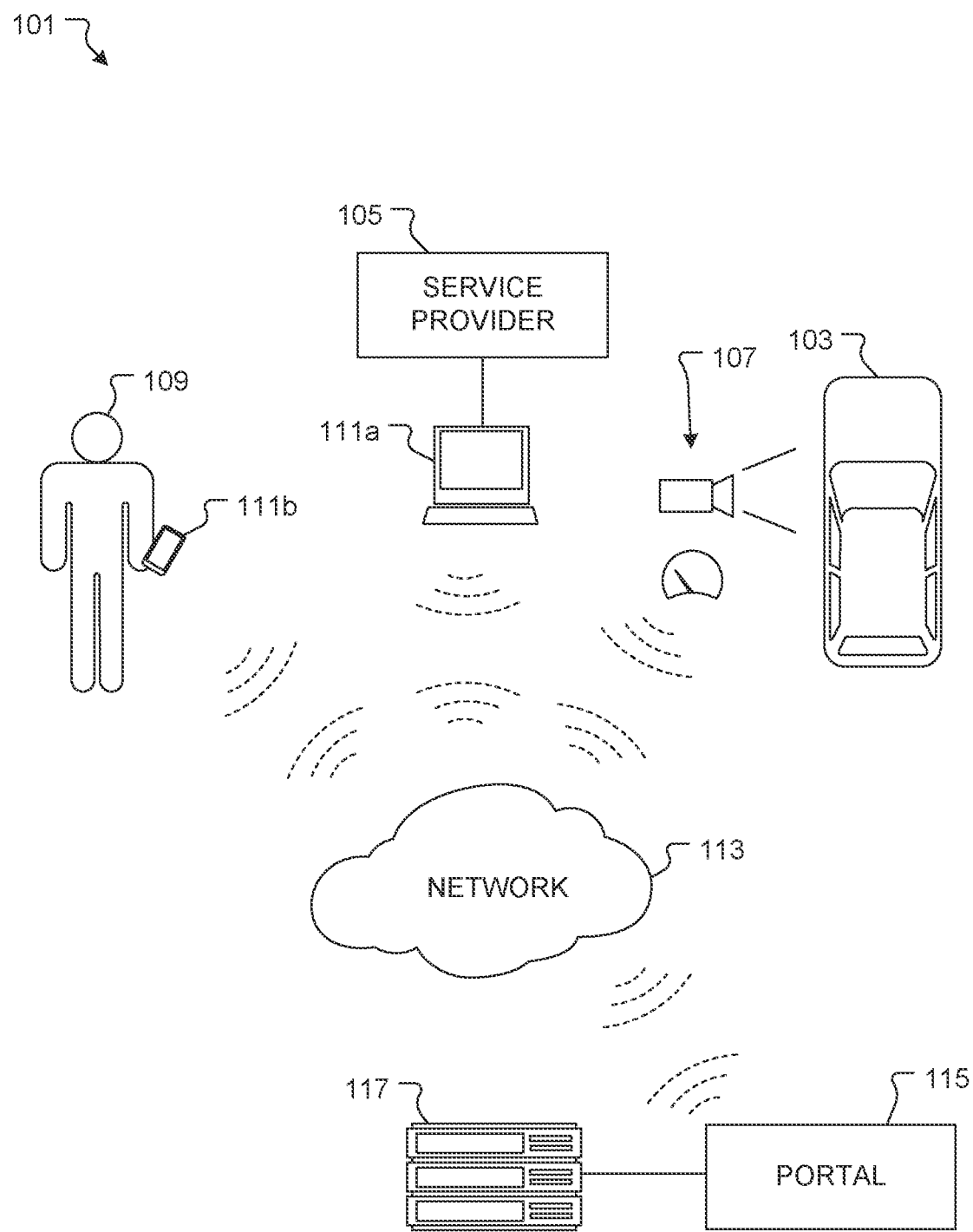
FIG. 1 is a diagram of a test drive system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional automotive service systems. Specifically, the invention of the present application allows for the recording of the route, the performance, the duration and other aspects of a test drive for the presentation of said data to the owner of the vehicle or another interested party. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a diagram of a test drive system in accordance with a preferred embodiment of the present application. It will be appreciated that system 101 overcomes one or more of the above-listed problems commonly associated with conventional automotive service systems.

In the contemplated embodiment, system 101 includes a vehicle 103 that has been entrusted to a service provider 105. The service provider 105 is in communication with a portal 115 via a network 113 and a computing device 111. The portal 115 is further in communication with a database 117. It is contemplated that the database 117 could contain data of its own creation or that of a third-party that provided data to the portal 115.

The portal 115 determines if the vehicle 103 is ready for a test drive. While on the test drive, data 107 such as images, video, GPS, performance metrics or other like information is captured by the portal 115 and associated with vehicle 103 from which it was taken.

The system 101 further includes a vehicle owner 109 in communication with the portal 115 via the network 113 and a computing device 111. The portal 115 is configured to allow the vehicle owner 109 to access the data 107 relative to their vehicle 103 to ensure that the vehicle 103 was not abused or misused and that all systems, including ADAS safety systems, operate as designed. It is contemplated that the vehicle owner 109 could be the actual owner, a representative thereof, an insurance provider or representative, dealer or representative or any other party interested in the vehicle.

In use, a vehicle owner 109 delivers the vehicle 103 to the service provider 105 for work to be done. The portal 115 receives data 107 about the work to be done. It is contemplated that this data 107 could be automated or manual in nature. When the or if the vehicle is ready or needs a test drive this status is shown to the service provider 105. The test drive begins and data 107 from the drive is recorded and transmitted to the portal 115 via the network 113. The data is accessible by both the service provider 105 and the vehicle owner 109 via the portal 115.

It should be appreciated that one of the unique features believed characteristic of the present application is that the portal enables the vehicle owner 109 to obtain data relevant to the use of the vehicle 103 during its repair or service work. This ability increased their trust towards the service provided 105.

Figure 2:
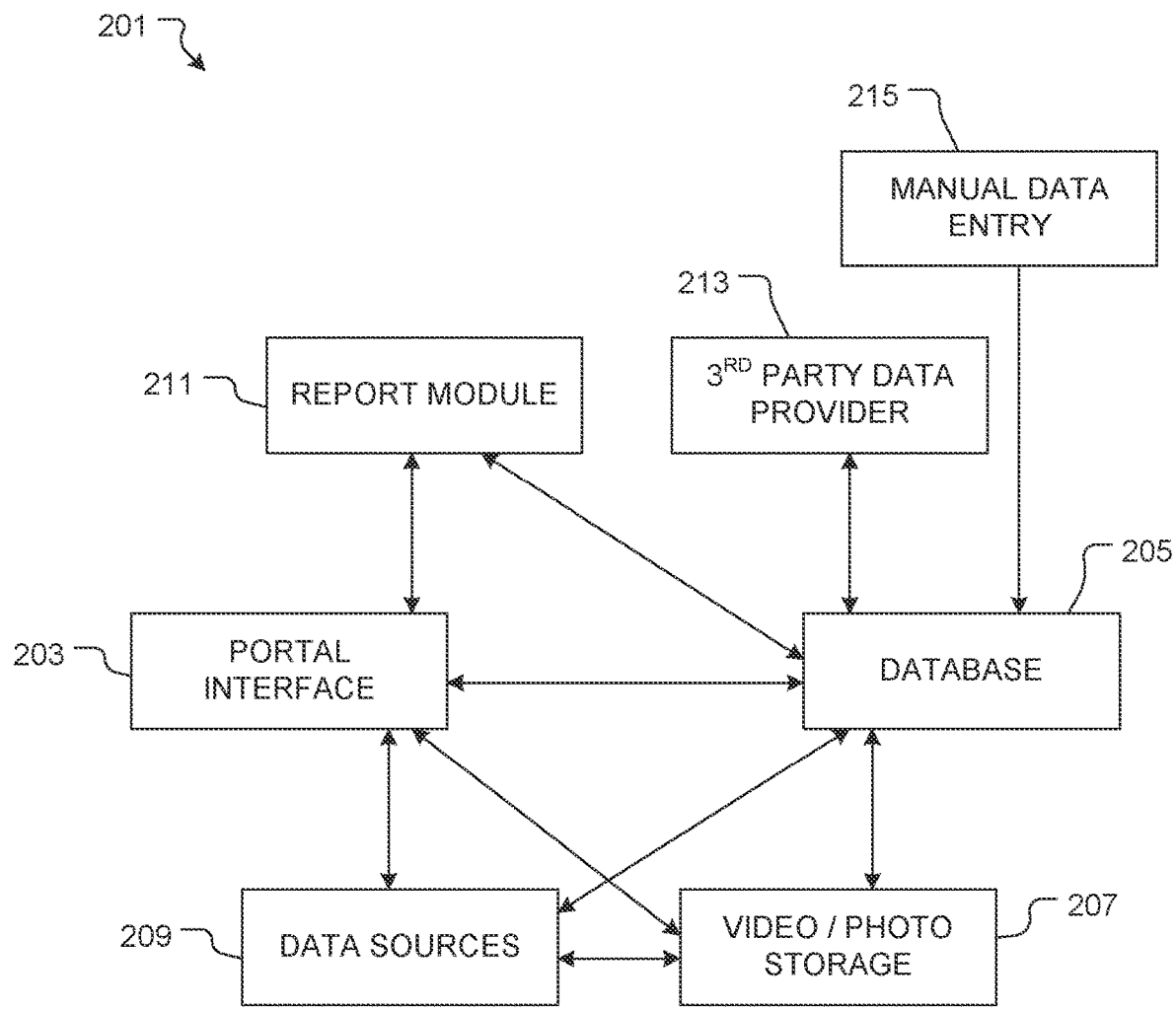
FIG. 2 is a simplified schematic of the interactions of the system of FIG. 1.

Referring now to FIG. 2 the interaction of the system 101 is depicted. It is contemplated that in an embodiment 201 in use that a portal interface 203 is the means whereby the service provider 105 and the vehicle owner 109 interact with the portal 115. It is contemplated that the portal interface 203 provides access to the database 205, a report module 211, data sources 209 and a video/photo storage 207.

It is contemplated that the database 205 is in communication with a third-party data provider 213 wherein information relevant to the work or status of the car is exchanged. It is contemplated that manual data entry 215 could be used to populate data in the database 205.

The data sources 209 are contemplated to capture imagery about the test dive they are contemplated to send this data to the video/photo storage 207. It is contemplated that these data sources 209 could be automated, mechanical, human operators or the like.

These interactions are provided as examples of how system 101 is contemplated to operate and are not intended to limit the scope of the system or its function.

Figure 3:
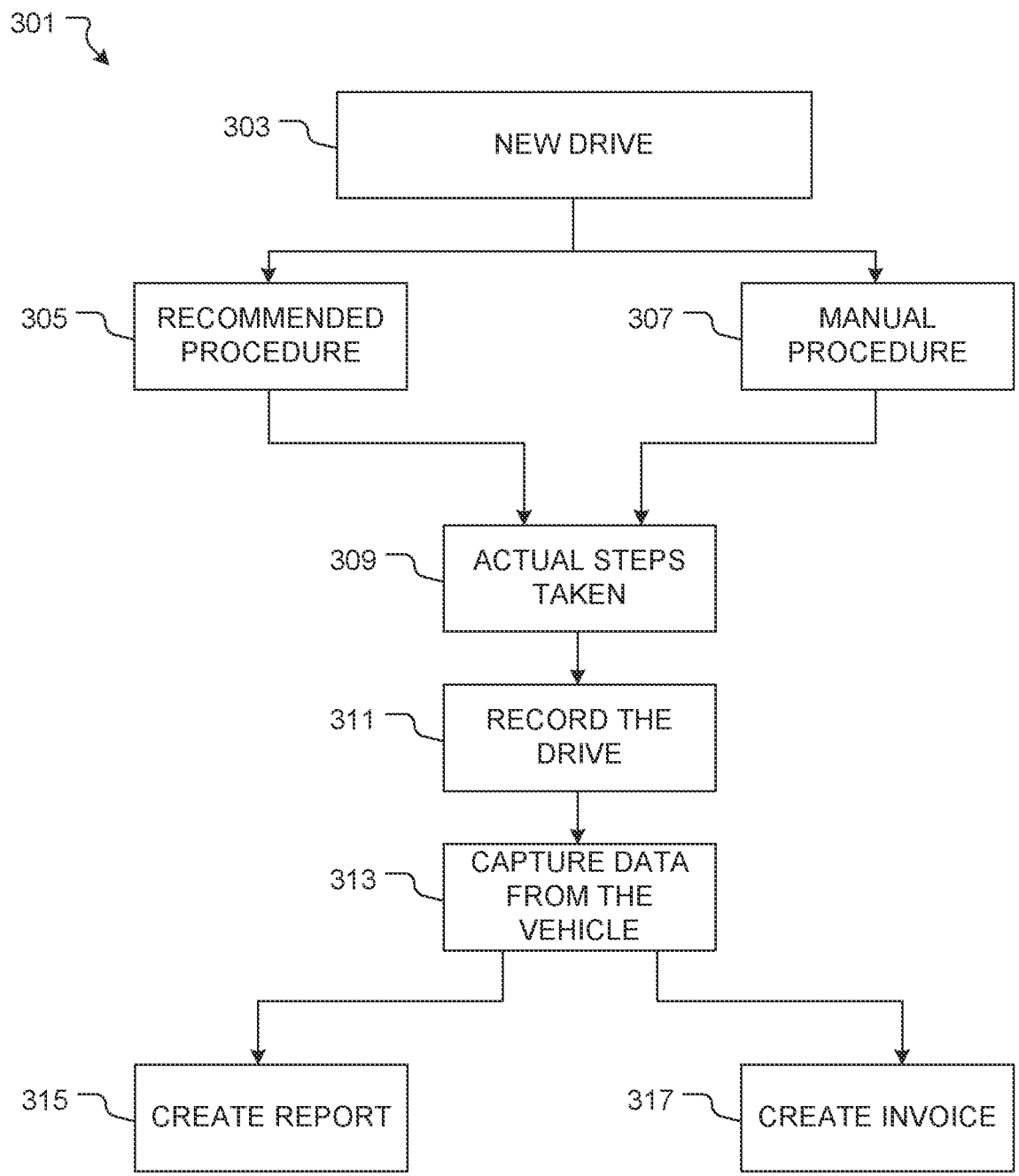
FIG. 3 is a simplified schematic of a drive of the system of FIG. 1.
Figure 4:
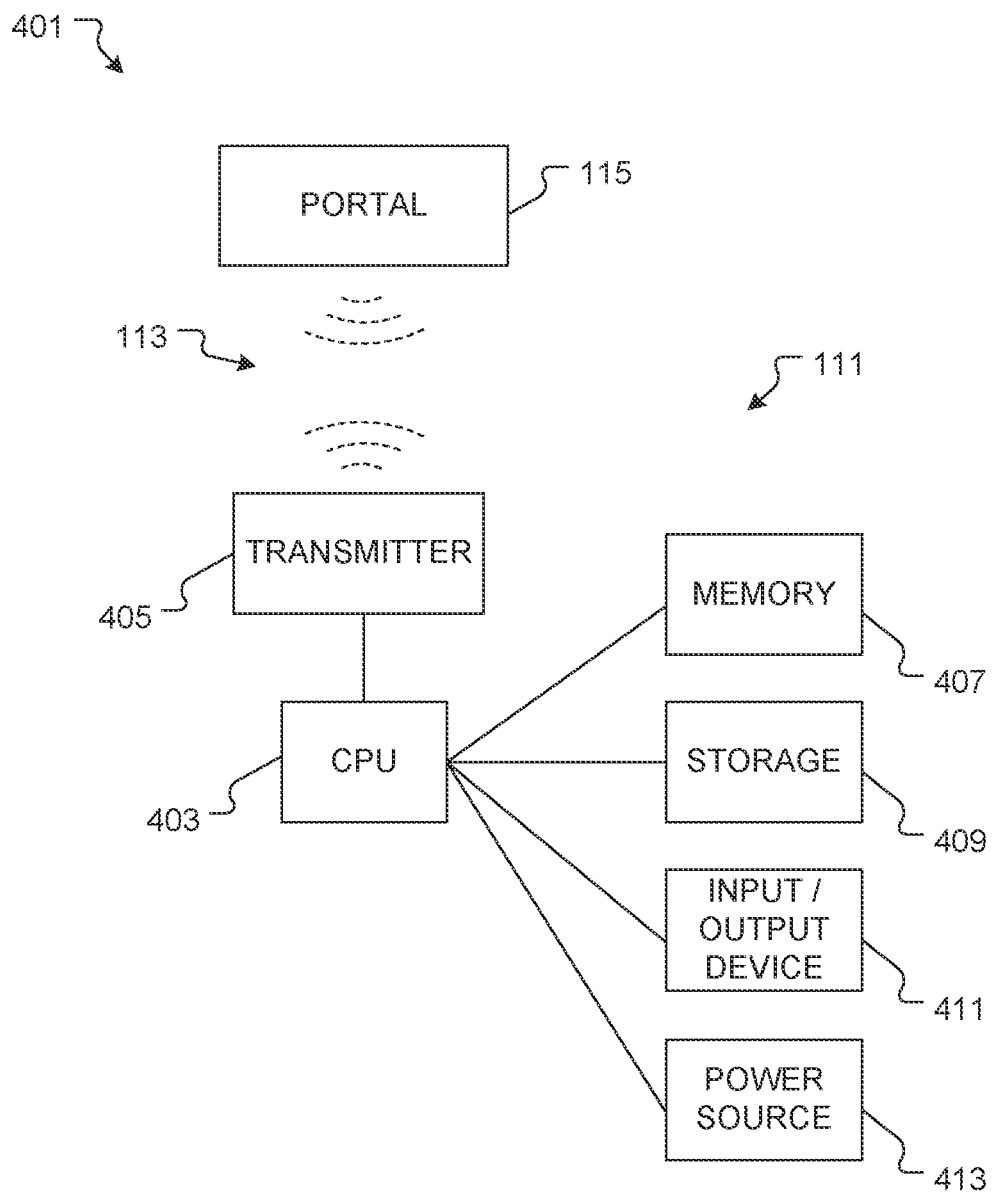
FIG. 4 is a diagram of the electronic environment of the system of FIG. 1.

For example, FIG. 3 depicts a test drive 301 with the system 101 in use. When a new drive 303 is requested or needed the portal provides the user with a recommend produce 305 for the test drive. It is contemplated that this recommended procedure could be from the vehicle manufacturer or developed by experience. The user has the choice to accept the recommended procedure 305 or to manually enter a procedure 307 to the portal. The portal then collects the actual steps taken 309 to ensure the integrity of the drive. It is contemplated that these actual steps taken 309 could be collected through automated tools or by an observer. The portal records the drive in a video or other graphic form. The portal also captures data from the vehicle 301 and driver related to the performance of the vehicle during the drive.

The portal uses the data collected to create a report 315 of the drive that is provided to the vehicle owner as evidence of the drive performed. The portal also uses the data to populate and otherwise create an invoice 317 for the service rendered to the vehicle or the test drive itself.

It will be understood and appreciated that the system 101 operates in an electronic environment 401 that is created and exists within the system 101. The environment 401 includes the portal 115 in communication with the computing devices 111 through the network 113. The computing devices 111 include components that allow for the device to operate and perform calculations to enable the system. The components include a CPU 403 that directs the remaining components such as a transmitter 405, memory 407, storage 409, input/output devices 411 and a power source 413. It will be understood that these components function in harmony to create the environment wherein the system 101 functions.

Figure 5:
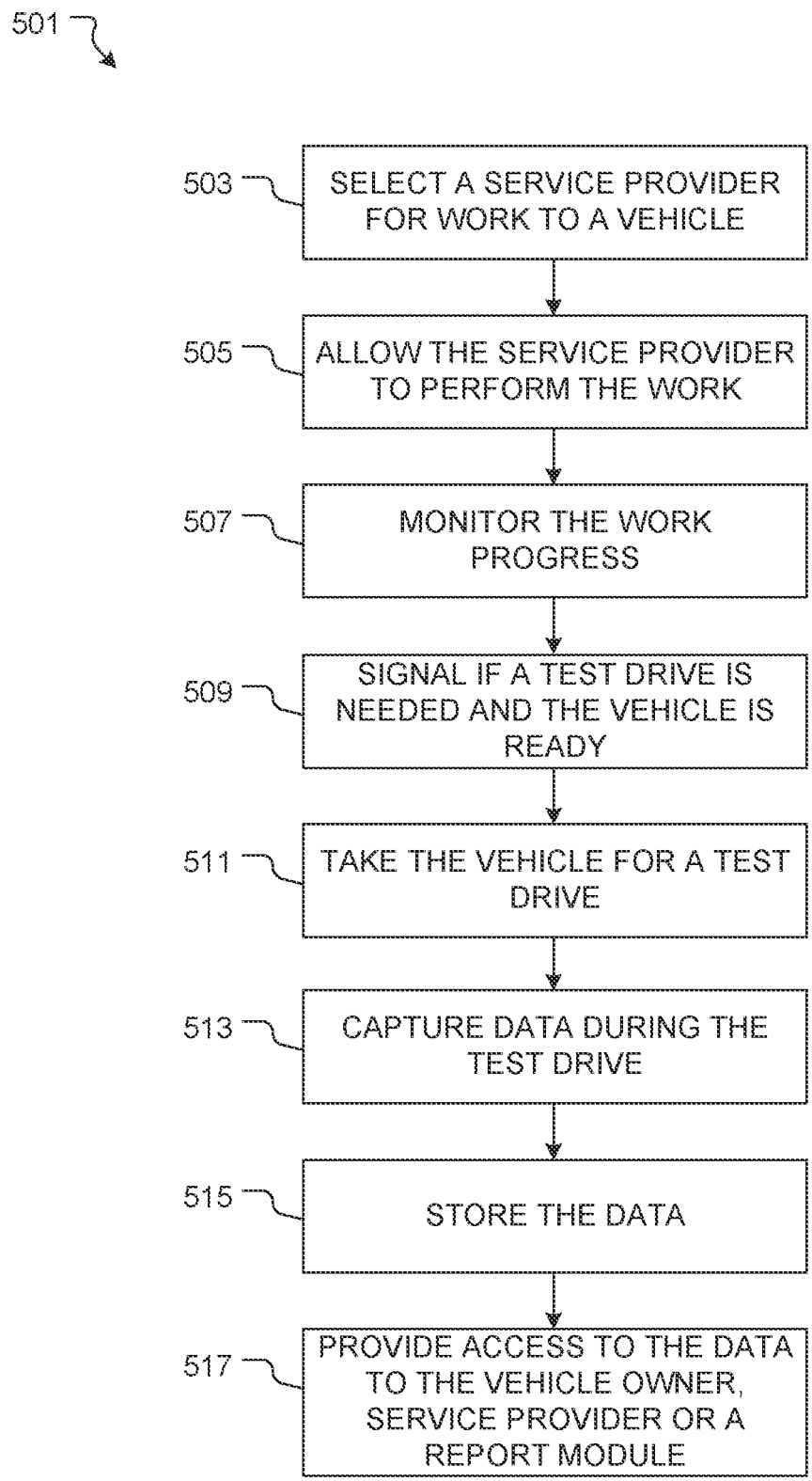
FIG. 5 is a flowchart of the preferred method of use of the system of FIG. 1.

Referring now to FIG. 5 a method of conducting a test drive is depicted. Method 501 includes selecting a service provider for work to a vehicle 503, allowing the service provider to perform the work 505, monitoring the work progress 507, signaling that a test drive is needed and that the vehicle is ready 509, taking the vehicle for a test drive 511, capturing data during the test drive 513, storing the data 515 and providing access to the data to the vehicle owner, service provider or a report module 517.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A test drive system comprising:
   a portal having an interface;
   a network;
   at least one computing device wherein the portal, the network, and the at least one computing device are all in electronic communication;
   a vehicle in need of a test drive, the vehicle having a camera to capture images;
   a machine configured to capture at least one location associated with the vehicle during the test drive, the machine is secured to the vehicle; and
   a report generated by both the camera and the machine, the report is presented through the portal and the interface that provides information related to the data captured;
   wherein the data captured is used to document an actual performance of the vehicle while on the test drive;
   wherein the portal provides recommendations of how to perform a test of at least one system of the vehicle; and
   wherein the portal presents the report to a vehicle owner, while the vehicle owner is at a remote location relative to the test drive and the vehicle.

* * * * *